UNITED STATES PATENT OFFICE.

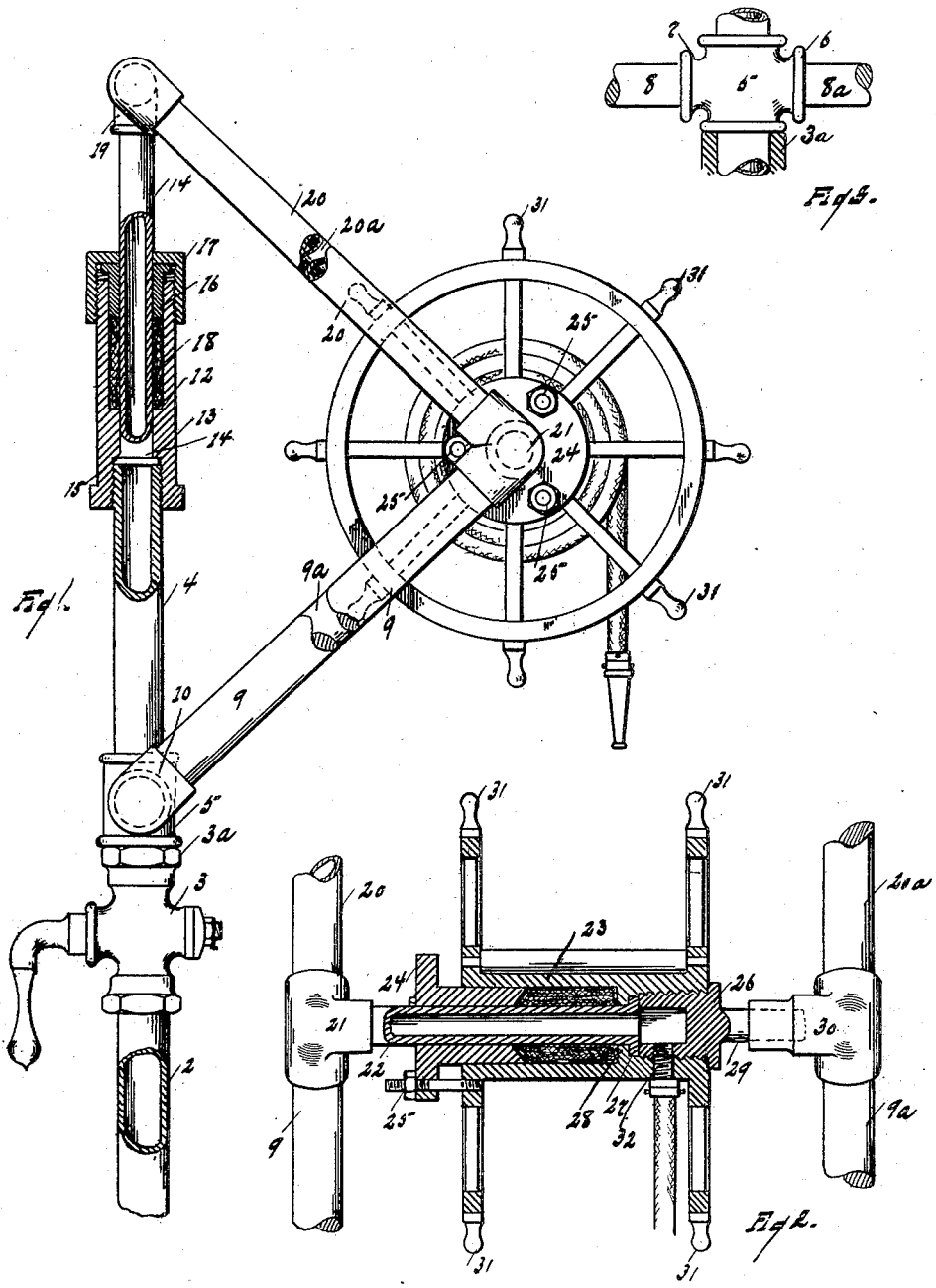

GEORGE E. LE MOND, OF DETROIT, MICHIGAN, ASSIGNOR OF TWO-THIRDS TO WALTER BOGART AND CHESTER GIVEN, OF DETROIT, MICHIGAN.

SWIVELED HOSE-REEL.

SPECIFICATION forming part of Letters Patent No. 706,968, dated August 12, 1902.

Application filed May 9, 1902. Serial No. 106,520. (No model.)

*To all whom it may concern:*

Be it known that I, GEORGE E. LE MOND, a citizen of the United States, residing at Detroit, county of Wayne, State of Michigan, have invented a certain new and useful Improvement in Swiveled Hose-Reels; and I declare the following to be a full, clear, and exact description of the invention, such as will enable others skilled in the art to which it pertains to make and use the same, reference being had to the accompanying drawings, which form a part of this specification.

This invention relates to hose-reels, and has for its object an improved reel arranged to be used in connection with a stand-pipe. The frame of the reel swings to present the axle of the drum on which the hose is wound at a line which is substantially at right angles to or across the line of draft when the hose is unwinding. Provision is made to introduce into the drum upon which the hose is wound water from the stand-pipe, and the inner end of the hose is connected to a nipple which forms an adjutage to said drum, so that water may be admitted directly from the stand-pipe into and through the drum and into and through the hose, from which it is used at any point within the distance covered by the length of the hose as a radius.

In the drawings, Figure 1 is a side elevation, partly in section, of the stand-pipe, the bracket sustained thereby, and the hose sustained by the bracket. Fig. 2 is a vertical section longitudinal of the drum of the hose-reel. Fig. 3 is an enlarged view of the swivel connection which sustains the lower end of the bracket.

2 indicates the stand-pipe, provided with any suitable gate or cock 3 and terminating with an open section 4 above the cock 3. The fitting which contains the cock 3 is finished on its upper side with a shoulder $3^a$, upon which rests a cross-shaped coupling 5. The terminal 4 passes through the coupling 5 freely, and the coupling can turn readily on the terminal 4. In each branch 6 and 7 of the coupling 5 is screwed a horizontal rod, one of which, 8, supports a bracket-arm 9, that is joined to it by an angle-coupling 10, and the other of which, $8^a$, supports a bracket-arm $9^a$, similar to the arm 9.

On the top of the section 4 is screwed a packing-coupling 12, and this is provided with an internal collar 13, that holds a flanged revoluble pipe 14. The flange 15 on the pipe 14 engages under the collar 13, the pipe 14 extends above the packing-coupling 12, and the annular opening between the pipe 14 and the packing-coupling is closed by nipple 16 and screw-cap 17, which together hold a packing-gland 18 in place. The pipe 14 branches at its top end or is connected to a horizontal cross-piece 19, from which arms lead to couplings that connect the arms with the arms 9 and $9^a$. The arm 20 is hollow, and that branch of the cross-piece 19 which leads from pipe 14 to the arm 20 is hollow, and the arm 20, which is joined to arm 9 by coupling 21, communicates through the coupling 21 with the hollow journal 22 of the reel. The hollow journal 22 extends partly through the drum 23 of the reel and is held in place by a structure that is similar to the packing-terminal of the rod 4, already described, comprising a gland-holder 24, which is held in place by bolts and nuts 25, and a screw-plug 26, engaging in the drum and holding in place the hollow journal 22, which is provided with a flange 27, that engages against an internal collar 28 in the drum. The plug 26 is provided with an extension 29, that engages in the coupling 30 as a bearing. The coupling 30 joins the bracket-arms $9^a$ and $20^a$, both of which may be solid, or at least are not necessarily arranged to permit the flow of water through them. In this construction it is necessary to have only two of the parts packed to prevent the leakage of water—namely, the packing-coupling, in which the pipe 14 swivels, and the junction between the arbor 22, which is fixed in place, and the drum of the reel.

The reel is provided with hand-grips 31, by which it may be rotated to wind the hose upon it. The inner end of the hose is attached to a coupling 32, through which there is a passage through the walls of the drum into the waterway or chamber on the interior thereof.

What I claim is—

1. In combination with a stand-pipe for water, a hose-reel, provided with a hollow drum, a bracket-support for said reel swiveled on the stand-pipe below its upper terminal, a revoluble pipe swiveled in a packing-coupling on said stand-pipe, bracket-arms connecting the upper end of said revoluble pipe to the reel, one of said bracket-arms being hollow and affording communication between the pipe and the reel-drum, substantially as described.

2. In combination with a stand-pipe for water, a hose-reel, an arm supporting said hose-reel and swiveled to the stand-pipe below its upper end, a second arm extending to a water-pipe in alinement with the stand-pipe and revoluble with respect thereto, substantially as described.

In testimony whereof I sign this specification in the presence of two witnesses.

GEORGE E. LE MOND.

Witnesses:
CHARLES F. BURTON,
MAY E. KOTT.